US009387504B2

(12) United States Patent  
Paetow, II et al.

(10) Patent No.: US 9,387,504 B2  
(45) Date of Patent: Jul. 12, 2016

(54) CARTRIDGE DISPENSER (71) Applicant: Nordson Corporation, Westlake, OH (US)

(72) Inventors: William C. Paetow, II, Pinckney, MI (US); Thomas R. Tudor, Westland, MI (US); Raymond C. Phillips, Novi, MI (US); Jeffry J. Grana, Holland, OH (US); Herman E. Turner, Jr., Plymouth, MI (US)

(73) Assignee: NORDSON CORPORATION, Westlake, OH (US)

( * ) Notice: Subject to any disclaimer, the term of this patent is extended or adjusted under 35 U.S.C. 154(b) by 142 days.

(21) Appl. No.: 14/151,076

(22) Filed: Jan. 9, 2014

(65) Prior Publication Data

US 2014/0197198 A1    Jul. 17, 2014

Related U.S. Application Data (60) Provisional application No. 61/753,674, filed on Jan. 17, 2013.

(51) Int. Cl.  
B67D 1/00 (2006.01)  
B05C 5/02 (2006.01)  
B05B 1/30 (2006.01)  
B05C 11/10 (2006.01)  
F16K 7/07 (2006.01)  
F16K 23/00 (2006.01)  
B05B 9/047 (2006.01)

(52) U.S. Cl.  
CPC ............... B05C 5/0225 (2013.01); B05B 1/30 (2013.01); B05C 5/0237 (2013.01); B05C 11/1013 (2013.01); F16K 7/07 (2013.01); F16K 23/00 (2013.01); B05B 9/047 (2013.01)

(58) Field of Classification Search  
CPC  B05C 5/0225; B05C 5/0237; B05C 11/1013; B05C 11/1002; B05C 11/10; B05C 11/1007; B05B 1/30; B05B 9/047; B05B 12/004; B05B 12/006; B05B 12/08; B05B 12/085; B05B 12/10; F16K 7/07; F16K 23/00; G01F 15/022  
USPC ............................ 222/55, 212, 214, 325, 326  
See application file for complete search history.

(56) References Cited

U.S. PATENT DOCUMENTS

| 4,030,640 | A | * | 6/1977 | Citrin | B05C 5/0225 141/117 |
| 4,922,852 | A | * | 5/1990 | Price | B05B 12/08 118/323 |
| 4,987,854 | A | * | 1/1991 | Hall | B05B 12/08 118/300 |
| 4,988,015 | A | * | 1/1991 | Price | B05B 13/0431 118/684 |
| 5,033,656 | A | * | 7/1991 | Blette | B67D 7/0216 222/212 |
| 5,035,350 | A | * | 7/1991 | Blette | B67D 7/0216 222/212 |

(Continued)

FOREIGN PATENT DOCUMENTS

DE           3935709           5/1991

*Primary Examiner* — Patrick M Buechner  
(74) *Attorney, Agent, or Firm* — Baker & Hostetler LLP (57) ABSTRACT

A cartridge dispenser generally includes an actuator, cartridge carrier, a removable cartridge, a dispenser head, and a cartridge piston. A sensor is configured to sense data and provide feedback data for controlling the actuator. The dispenser head is a multi-piece assembly allowing removal of an outlet flow tube for maintenance purposes. The tube may be a resilient tube and pinch valves are provided for fluid flow control from the dispenser.

16 Claims, 6 Drawing Sheets

(56) References Cited

U.S. PATENT DOCUMENTS

| | | | | |
|---|---|---|---|---|
| 5,316,215 A * | 5/1994 | Mitchell | ................ | B05B 9/047 137/624.14 |
| 5,316,217 A * | 5/1994 | Guzowski | ............. | B05B 12/004 137/557 |
| 5,673,732 A * | 10/1997 | Kenney | ................... | B67D 7/04 141/311 A |
| 5,816,445 A * | 10/1998 | Gardos | ............... | B01F 15/0454 222/1 |
| 6,321,798 B1 * | 11/2001 | Solignac | ............. | B01F 15/0234 141/192 |
| 2001/0020629 A1 * | 9/2001 | Fujii | ..................... | B05C 5/0225 222/504 |
| 2002/0043539 A1 * | 4/2002 | Pagel | ................... | B05C 5/0225 222/207 |

* cited by examiner

CARTRIDGE DISPENSER

CROSS-REFERENCE TO RELATED APPLICATION

This application claims the priority of Application Ser. No. 61/753,674 filed Jan. 17, 2013, the disclosure of which is hereby incorporated by reference herein.

BACKGROUND

Sealants, adhesives and other flowable materials are commonly used in a variety of manufacturing and other applications, including, for example aircraft, appliance and automobile manufacturing. In some applications, the flowable materials are provided in a pre-proportioned cartridge. The cartridge is then inserted into a caulking gun, which is used by a technician to manually apply the flowable material to an article of manufacture. This approach is time and labor intensive. An improved dispenser mechanism for automatically dispensing flowable material from a pre-proportioned cartridge is desirable.

SUMMARY

In a first general aspect, a cartridge dispenser is provided and comprises an actuator and a cartridge carrier configured to house a removable cartridge having a pre-proportioned amount of flowable material therein. A dispenser head is mounted to the cartridge carrier and includes an outlet port. A cartridge piston is responsive to the actuator and protrudes into the cartridge to apply pressure to the flowable material and force an amount of flowable material from the cartridge through the outlet port. A sensor is configured to sense data concerning the flowable material flowing from the cartridge through the outlet port, and to provide feedback data for controlling the actuator. As examples, the sensor may further comprise one or more of a pressure transducer, a pressure/temperature transducer, a temperature sensor, or a flow meter. In the case of a pressure transducer, for example, the cartridge dispenser may further comprise a controller coupled with the pressure transducer and configured to receive pressure data from the pressure transducer and perform diagnostics for detecting at least one of a spike in pressure of the flowable material or a drop in pressure of the flowable material.

In another independent aspect, the controller may be configured to receive pressure data and to also receive data related to the flow rate of the flowable material and to use the pressure data and the flow rate data to diagnose performance characteristics of the cartridge dispenser. For example, the controller may be configured to detect a plugged nozzle based on a spike in pressure and/or configured to detect a leak based on a drop in the pressure.

In another independent aspect of the invention, at least a first pinch valve and a resilient tube are provided. The resilient tube is carried within the dispenser head and provides a flow path generally between the cartridge and the outlet port. The first pinch valve is configured to move between first and second positions. The resilient tube is opened to allow flow of the flowable material through the resilient tube and past the first pinch valve when the first pinch valve is in the first position. The resilient tube is pinched off to prevent flow of the flowable material to the outlet port when the first pinch valve is in the second position.

In another independent aspect, a second pinch valve may be provided and carried by the dispenser head. The second pinch valve is also movable between first and second positions. The resilient tube is opened to allow flow of the flowable material through the resilient tube to the outlet port when the first and second pinch valves are in their respective first positions. The resilient tube is pinched off to prevent flow of the flowable material to the outlet port when at least one of the first or second pinch valves is in its second position. The first pinch valve is located along the resilient tube at a position closer to the cartridge than the second pinch valve. In other words, the first pinch valve is upstream of the second pinch valve relative to the outlet port. The controller may be configured to operate the first and second pinch valve in succession such that at the end of a dispensing cycle the first and second pinch valves are each placed in their second positions to stop the flow of flowable material to the outlet port. Then, the second pinch valve, i.e., the pinch valve located closest to the outlet port, is moved to its first position to thereby suck back flowable material from the outlet port. This, for example, can help prevent drooling of excess flowable material from the outlet port after the cartridge dispenser has been shut off at the end of a dispensing cycle.

In another independent aspect, the dispenser head is comprised of a multi-piece assembly. In this regard, the multi-piece assembly includes a tube which generally provides a flow path between the cartridge and the outlet port. In this general aspect, the tube may or may not be resilient. When the multi-piece assembly is disassembled, the tube may be removed for cleaning and/or replacement purposes thereby facilitating easy maintenance. The tube, for example, may be coupled with fittings at opposite ends allowing a fluid tight flow path to be created between the tube and the cartridge, for example, at an upstream location and between the tube and a downstream fluid component, such as a dispensing outlet nozzle or other fitting.

In another independent aspect, a method of operating a cartridge dispenser is provided. The cartridge dispenser may include various components such as described herein. The method generally comprises placing the first pinch valve in a first position to form a flow path within the resilient tube past the first pinch valve. The cartridge piston is moved into the cartridge to apply pressure to the flowable material to thereby move the flowable material through the cartridge and also through the resilient tube past the first pinch valve. The first pinch valve is moved to a second position to pinch off the resilient tube and stop the flow of flowable material past the first pinch valve. As described above, a second pinch valve may be provided and the method may further comprise placing the first and second pinch valves in their respective first positions to allow flow of the flowable material through the resilient tube to the outlet port, and then placing at least one of the first or second pinch valves in its second position to pinch off the resilient tube and prevent flow of the flowable material to the outlet port. In an additional embodiment or aspect, the first and second pinch valves are operated in succession at the end of a dispensing cycle, such that the first and second pinch valves are each placed in their second positions to stop the flow of flowable material to the outlet port, and then the second pinch valve is moved to its first position to thereby suck back flowable material from the outlet port.

Various additional features and advantages will become more apparent to those of ordinary skill upon review of the following detailed description of the illustrative embodiments taken in conjunction with the accompanying drawings.

DETAILED DESCRIPTION

Figure 1:
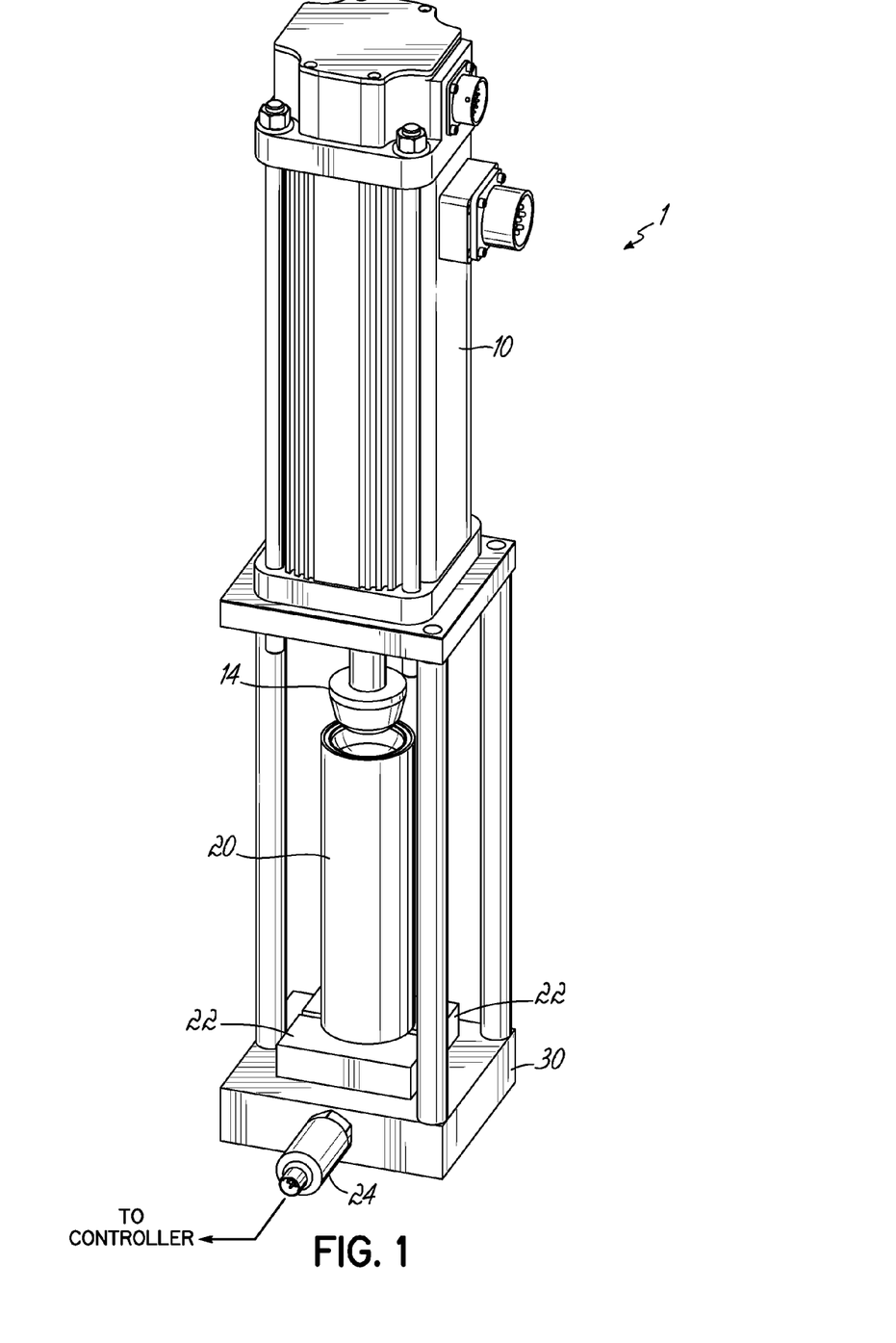
FIG. 1 is a perspective view of a cartridge dispenser constructed in accordance with an illustrative embodiment of the invention.
Figure 2:
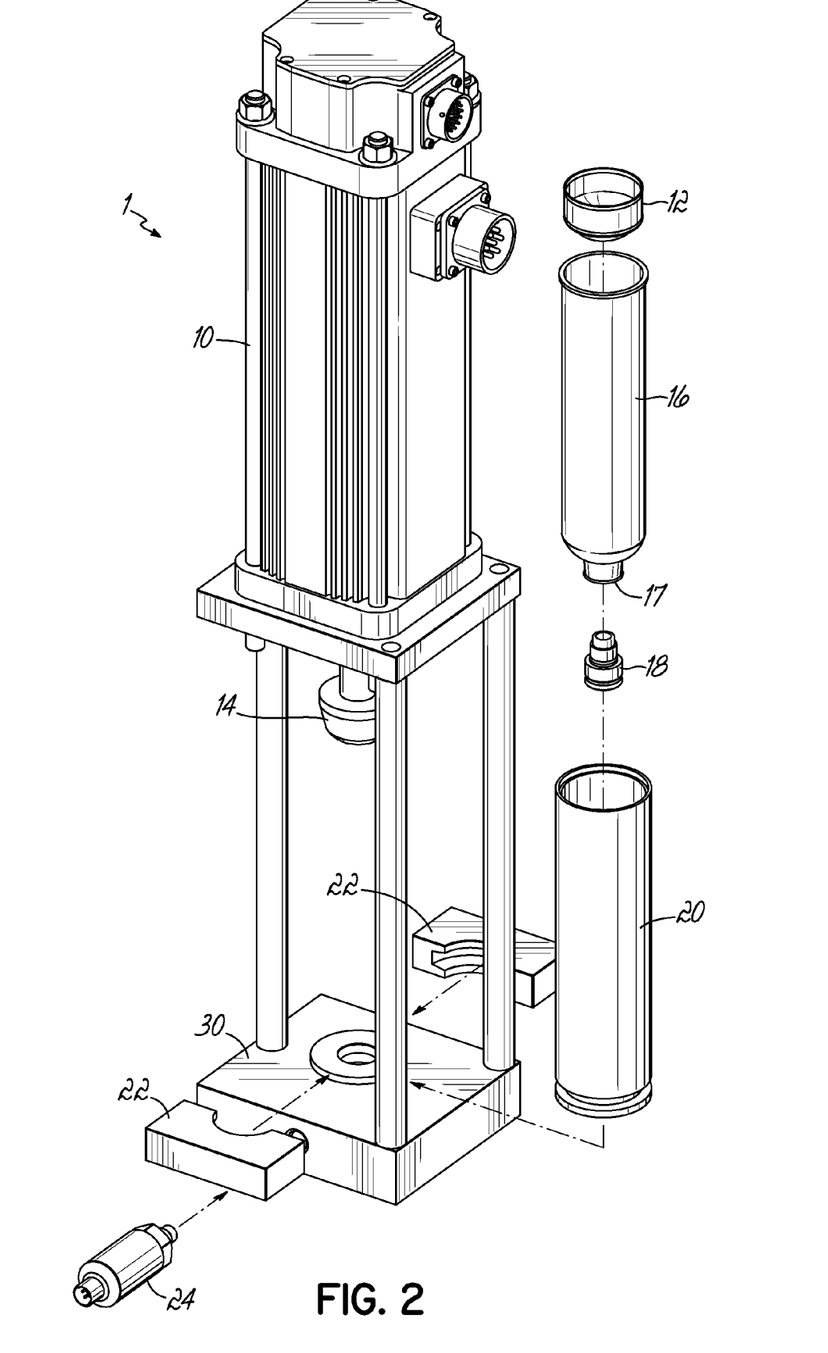
FIG. 2 is a perspective view similar to FIG. 1, but illustrating various components in exploded form.

Referring to FIGS. 1 and 2, a cartridge dispenser 1 in accordance with an illustrative embodiment of the invention includes an actuator 10 that produces controlled linear thrust and motion. The actuator 10 may be powered by known means of providing power, including for example electric, hydraulic and pneumatic power. The actuator 10 is controlled by an electronic controller that provides control signals to the actuator 10. The actuator 10 includes feedback components that provide information (e.g., position and rate) to the controller 11, which can be translated into flow rate data, force data, volume displaced data and volume remaining data, for example, all of which may be employed to control the actuator 10 and thus the process of flowable material deposition.

Figure 3:
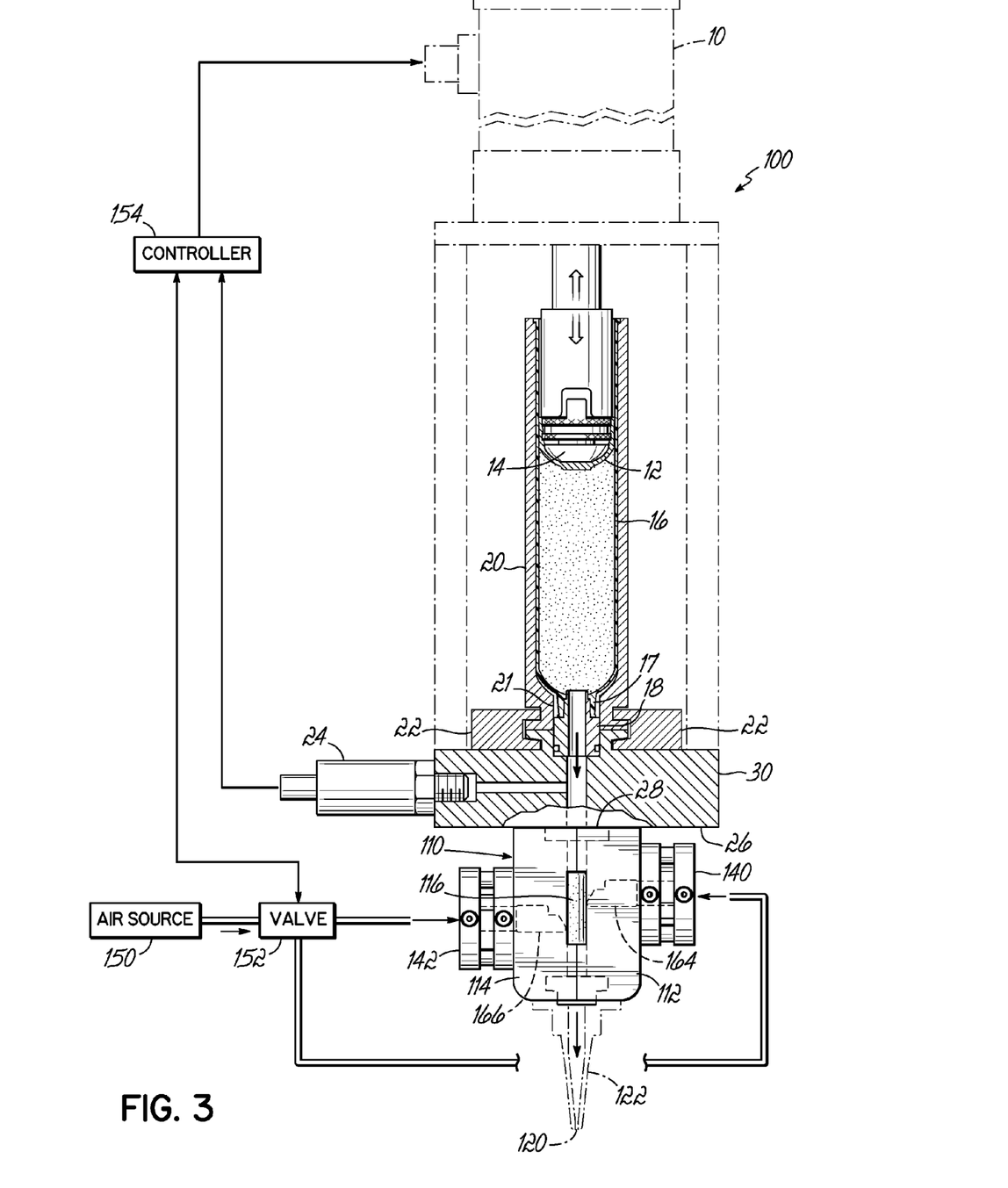
FIG. 3 is a schematic and partially sectioned view of another embodiment of a cartridge dispenser.

The thrust from the actuator 10 is delivered to a cartridge piston 12 via a cartridge piston plunger 14. A cartridge carrier 20 houses a removable cartridge 16. A cartridge outlet adaptor 18 interfaces between the outlet 17 of the cartridge 16 and the outlet 21 of the cartridge carrier 20 (FIG. 3). The cartridge 16 is intended to contain a pre-proportioned amount of flowable material. The cartridge carrier 20 is intended to contain and position the cartridge 16 and to prevent the cartridge 16 from expanding under pressure. The cartridge outlet adapter 18 creates a closed path for the flowable material from the cartridge 16 through the cartridge carrier 20.

The cartridge carrier 20 is secured to a dispenser head 30 by cartridge carrier clamps 22. A discharge port 28 (FIG. 3) is disposed on a side 26 of the dispenser head 30. The side 26 of the dispenser head 30 also serves as a mounting surface for mounting downstream components that may be connected to the discharge port 28, such as, for example, on/off control valves, nozzles, airless spray, airless air/assisted spray, spray or various combinations of such attachments (not shown) to control the deposition and/or shape of the flowable materials.

A sensor 24 (or multiple sensors), such as a pressure transducer or a pressure/temperature transducer, may be interfaced to the cartridge dispenser at the dispenser head 30 to elicit data (e.g., pressure and/or temperature) concerning the flowable material in order to provide feedback control data to control the actuator 10. For example, pressure data at the dispense head 30 may be used in conjunction with flow rate data to determine if flowable material is deposited. Additionally, pressure data may be used to determine the presence of air bubbles within the flowable material being dispensed. Pressure data at the dispense head 30 (generated by sensor 24) may also be used in combination with flow rate/volume data—which can be generated by measuring strokes of the actuator 10—to perform certain diagnostics for the system. For example, a spike in pressure may indicate a plugged nozzle, whereas a drop in pressure below a particular threshold in combination with data indicating that there is consistent material flow in the system may indicate a leak in the cartridge 16 or other area of the system. Temperature data may be used to determine if the flowable material is within appropriate limits for dispensing. Various combinations of feedback data may be combined to further control the deposition and shape of the flowable material with respect to viscosity variance compensation.

In use, a cartridge 16 having a pre-proportioned amount of flowable material is inserted into the cartridge carrier 20 and secured to the cartridge outlet adapter 18. In response to control signals from the controller, the actuator 10 causes the cartridge piston plunger 14 and the cartridge piston 12 to press or move into the cartridge 16, applying pressure to the flowable material therein. The flowable material is pushed out of the cartridge 16 through the cartridge outlet adapter 18 and the discharge port 28 and through one or more downstream components that may be mounted to the mounting surface 26 and connected to the discharge port 28. During operation, the controller receives feedback data from the actuator 10 and the sensor 24, which is used to control the actuator 10 and thus the process of flowable material deposition. The feedback data received from the actuator 10 (e.g., material flow data) and sensor 24 (e.g., pressure and/or temperature data), as well as data from other possible sensors, may also be used for a variety of diagnostic purposes (as described above, for example).

Use of the disclosed improved cartridge dispenser 1 may result in less labor, decreased application time, reduced waste and greater control of the shape of the applied flowable material. It also provides an opportunity for better system diagnostics.

Figure 4:
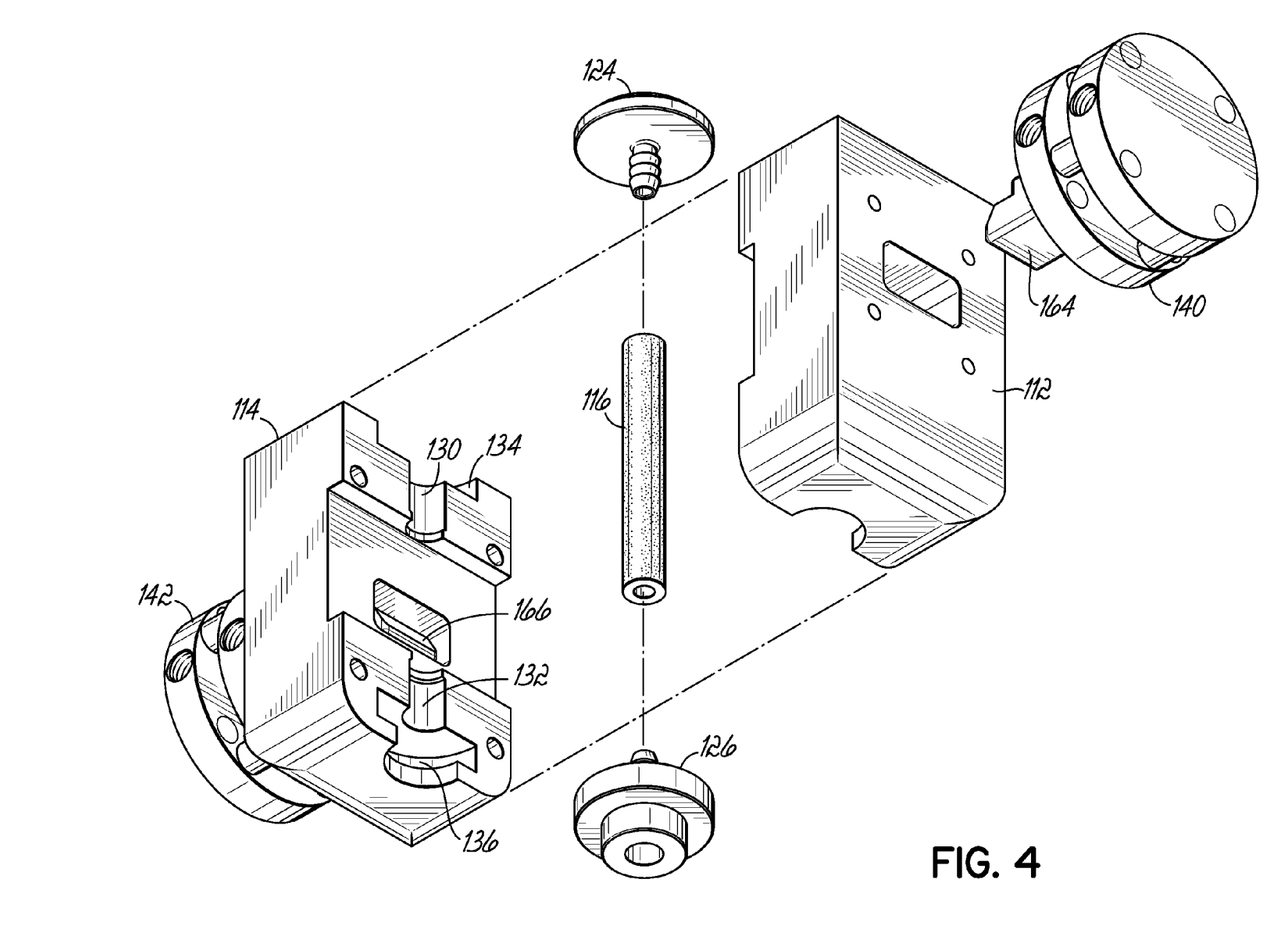
FIG. 4 is an exploded perspective view of a dispenser head associated with the cartridge dispenser of FIG. 3.

FIG. 3 illustrates another embodiment of a cartridge dispenser 100 similar to cartridge dispenser 1, but including a modified dispenser head 110. In the figures, like reference numbers refer to like elements and, therefore, additional description of such elements is not necessary. More specifically, and referring also to FIG. 4, the cartridge dispenser 100 includes a dispenser head 110 comprised of a multi-piece assembly. The dispenser head 110 includes first and second pieces 112, 114 that has a resilient tube 116 generally providing a flow path between the cartridge 16 and an outlet port 120 which, in this example, is provided in a dispensing nozzle 122 (FIG. 3). The resilient tube 116 may be formed, for example, from a fluorocarbon rubber and may be coupled with barbed fittings 124, 126 at upstream and downstream ends thereof. The fittings 124, 126 and the two pieces 112, 114 of the assembly may, for example, be formed from a suitable polymer such as the polymer sold under the trademark Delrin®, or other desired materials depending on the application needs. The resilient rubber tube 116 sits within recesses 130, 132 within the first and second pieces 112, 114 such that when the first and second pieces 112, 114 are securely fastened together, such as with threaded fasteners (not shown), the resilient tube 116 is firmly held in place. Additional recesses 134, 136 are provided in each piece 112, 114 for the fluid fittings 124, 126 at opposite ends of the resilient tube 116. First and second pinch valves 140, 142 are also securely fastened, respectively, to the first and second pieces 112, 114. The pinch valves 140, 142 are pneumatically operated, but it will be understood that other types of actuators such as electrical actuators may be used instead. As further described below in connection with FIGS. 5A-5D, the pinch valves 140, 142 are used to stop and start the flow of flowable material through the resilient tube 116 as well as to provide a snuff back feature.

Referring again to FIG. 3, the pinch valves 140, 142 are supplied with pressurized air from an air source 150 through one or more suitable control valves 152. The control valve or valves 152 control the flow of pressurized air to the pneumatic pinch valves 140, 142 for purposes of moving the pinch valves 140, 142 between first and second, or extended and retracted, positions as described below. The control valve or valves 152 is/are suitably coupled with a controller 154 for purposes of controlling the operation of the pinch valves 140, 142. It will be understood that the controller 154 may or may not be a single unitary control unit or computer. It may, for example, comprise different control components located in different locations. The use of a single icon or symbol labeled "controller" in the figures is simply for schematic purposes.

Figure 5A:
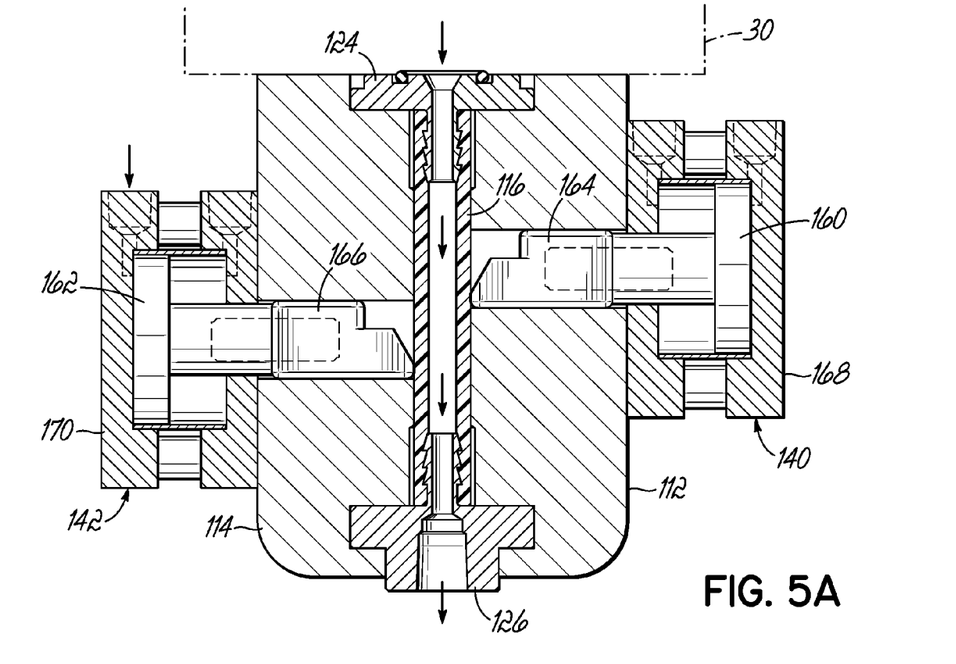
FIGS. 5A-5D are respective sectional views illustrating the operation of pinch valves associated with the dispenser head of FIG. 4, in assembled form.
Figure 5B:
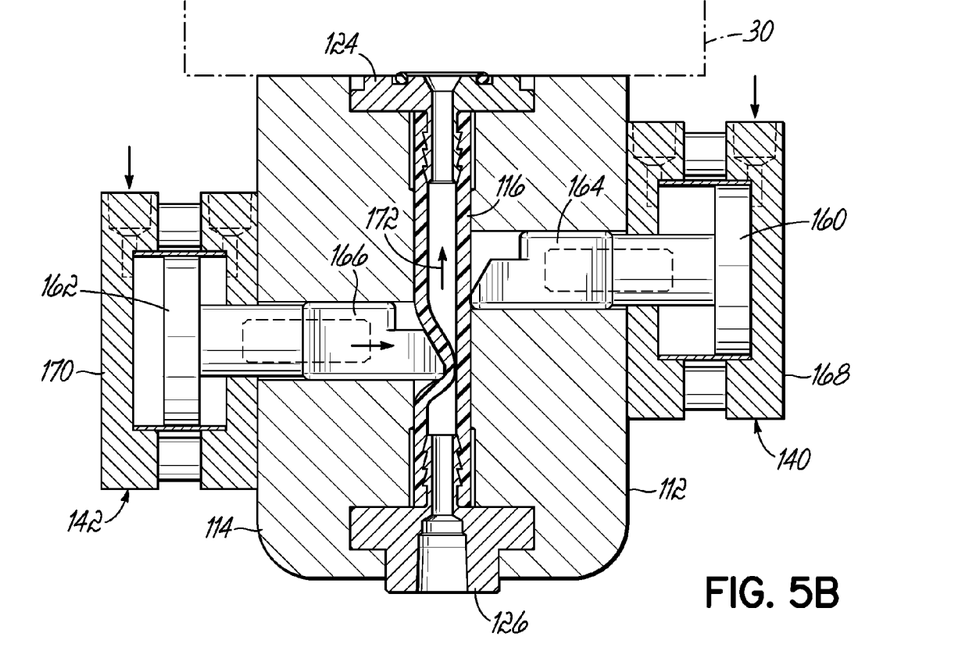
Figure 5C:
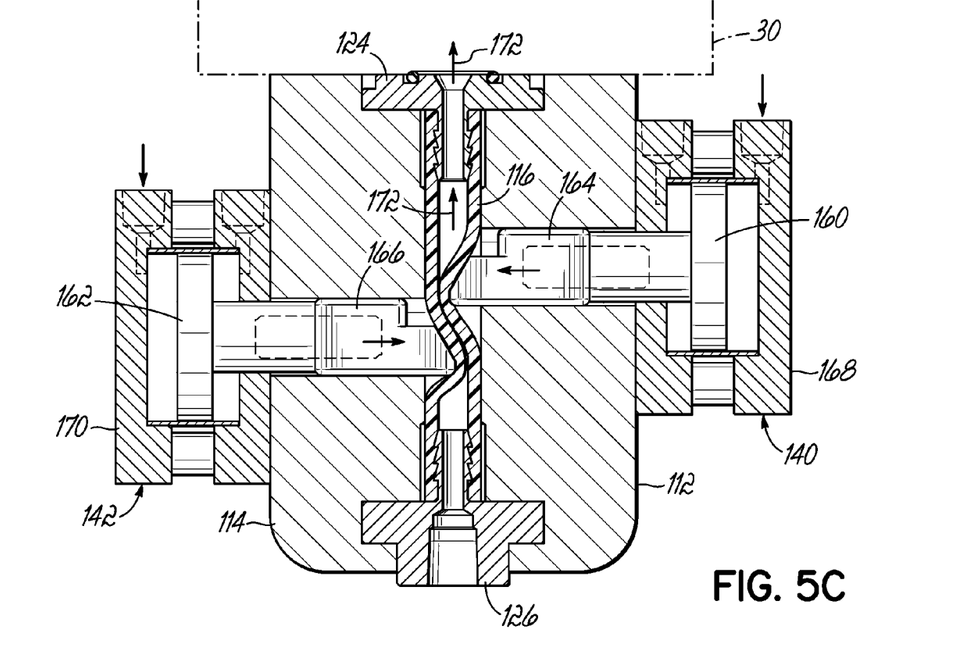
Figure 5D:
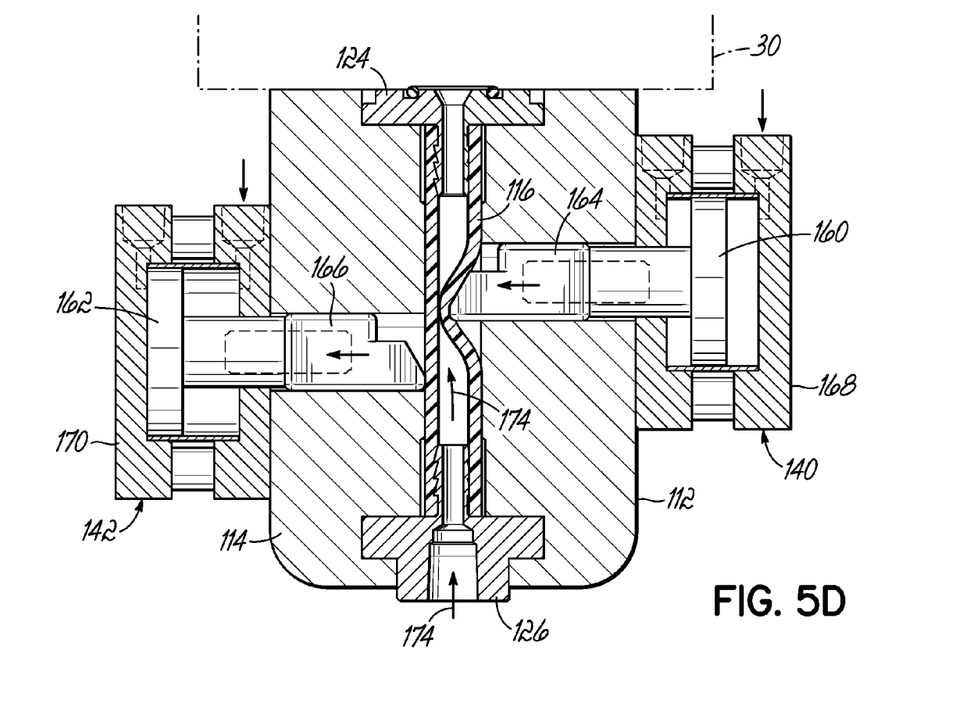

FIG. 5A illustrates the first and second pinch valves 140, 142 each in a retracted, first position to thereby establish a flow path fully through the interior of the resilient tube 116. In these positions, pressurized air is introduced into the pneumatic actuating portion of each pinch valve 140, 142 to push the inner pistons 160, 162 coupled with anvil portions 164, 166 of the pinch valves 140, 142 to the outsides of the pinch valve housings 168, 170. FIG. 5B illustrates the first pinch valve 140 (anvil 164) still in its retracted, first position, but the second pinch valve 142 (anvil 166) moved or actuated to its extended, second position such that the anvil portion 166 pinches off the resilient tube 116 and stops the flow of material. As indicated by the arrow 172, a portion of the material will be forced upward. This stops the flow of flowable material at the end of a dispensing cycle. As shown in FIG. 5C, a very short time later, such as 1 millisecond, the first pinch valve 140 extends to its second, extended position further forcing flowable material upward as indicated by the arrows 172 toward the cartridge 16. This further evacuates the resilient tube 116. Immediately thereafter, the second pinch valve 142 (anvil 166) is retracted to its first position and flowable material downstream of this location will flow upwardly away from the outlet port 120 (FIG. 3) to thereby suck back flowable material from the outlet port 120 and help prevent drooling. This suck back or snuff back effect is indicated by arrows 174. The flow of material remains shut off due to the extension of anvil 164. This feature works on the principle that the pressure within the tube 116 will tend to equalize or reach atmospheric pressure thereby pulling fluid up into the evacuated space within the tube 116 formed by the movement of the pinch valves 140, 142 as described.

Variations to the above-described embodiment may be employed, though not explicitly illustrated in the Figures. For example, the cartridge dispenser 1 may further include a flow meter (in addition to or instead of the sensor 24) to monitor the flowable material and provide feedback to the controller to control the actuator 10 (e.g., control flow rate and volume). Additionally, a vision system may be employed to monitor the deposited/shaped material, which could further provide feedback control signals to ultimately assist in the control of the actuator 10. The cartridge dispenser 1 could also be configured with temperature control systems, which would enable the system to better control the temperature and viscosity of the flowable material.

Further, while the Figures illustrate a single cartridge design, the system could be modified to include an automated cartridge changer and rotary or inline magazines, or otherwise designed to contain and use multiple cartridges. The cartridge dispenser 1 can be operated as a stand-alone system or it could be used in connection with robotic apparatus and controllers to enable automated operation.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be from such details without departing from the scope or spirit of the general inventive concept.

What is claimed is:

1. A cartridge dispenser, comprising:
   an actuator;
   a cartridge carrier configured to house a removable cartridge having a pre-proportioned amount of flowable material therein;
   a dispenser head mounted to said cartridge carrier, said dispenser head having:
      an outlet port,
      a tube carried within said dispenser head, said tube providing a flow path generally between said removable cartridge and said outlet port,
      a first pinch valve configured to move between a first position and a second position, wherein, in the first position of the first pinch valve, the tube is open to allow flow of the flowable material through the tube and past the first pinch valve, and in the second position of the first pinch valve, the tube is pinched off to prevent flow of the flowable material to the outlet port, and
      a second pinch valve configured to move between a first position and a second position, wherein, in the first position of the second pinch valve, the tube is open to allow flow of the flowable material through the tube and past the second pinch valve, and in the second position of the second pinch valve, the tube is pinched off to prevent flow of the flowable material to the outlet port,
      wherein the dispenser head has a first configuration and a second configuration, wherein, in the first configuration, the first pinch valve and the second pinch valve are in their respective first positions, and in the second configuration, at least one of the first pinch valve and the second pinch valve are in their respective second positions;
   a cartridge piston responsive to said actuator and configured to protrude into the removable cartridge to apply pressure to the flowable material and force an amount of flowable material from said removable cartridge through said outlet port of said dispenser head; and
   a sensor configured to sense data concerning the flowable material flowing from said cartridge through said outlet port, and to provide feedback data for controlling said actuator.

2. The cartridge dispenser of claim 1, wherein said sensor further comprises: a pressure transducer, a pressure/temperature transducer, a temperature sensor, a flow meter or combinations thereof.

3. The cartridge dispenser of claim 1, wherein said sensor further comprises a pressure transducer, the cartridge dispenser further comprising a controller coupled with the pressure transducer, said controller configured to receive pressure data from said pressure transducer and perform diagnostics for detecting at least one of: a spike in pressure of the flowable material or a drop in pressure of the flowable material.

4. The cartridge dispenser of claim 1, wherein said dispenser head further comprises a multi-piece assembly, said tube capable of being removed and cleaned or replaced for maintenance when the multi-piece assembly is disassembled.

5. A cartridge dispenser, comprising:
   an actuator;
   a cartridge carrier configured to house a removable cartridge having a pre-proportioned amount of flowable material therein;

a dispenser head mounted to said cartridge carrier, said dispenser head having:
an outlet port for dispensing the flowable material,
a first pinch valve configured to move between a first position and a second position, wherein, in the first position of the first pinch valve, the first pinch valve is open to allow flow of the flowable material past the first pinch valve towards the outlet port, and in the second position of the first pinch valve, the first pinch valve is closed to prevent flow of the flowable material towards the outlet port, and
a second pinch valve configured to move between a first position and a second position, wherein, in the first position of the second pinch valve, the second pinch valve is open to allow flow of the flowable material past the second pinch valve towards the outlet port, and in the second position of the second pinch valve, the second pinch valve is closed to prevent flow of the flowable material towards the outlet port,
wherein the dispenser head has a first configuration and a second configuration, wherein, in the first configuration, the first pinch valve and the second pinch valve are in their respective first positions, and in the second configuration, at least one of the first pinch valve and the second pinch valve are in their respective second positions;
a pressure sensor configured to generate data indicative of pressure of the flowable material at the outlet port; and
a controller configured to receive said pressure data and to receive data relating to the flow rate of the flowable material and to use said pressure data and said flow rate data to diagnose performance characteristics of said cartridge dispenser.

6. The cartridge dispenser of claim 5, wherein said controller is configured to detect a plugged nozzle based on a spike in pressure.

7. The cartridge dispenser of claim 5, wherein said controller is configured to detect a leak based on a drop in the pressure.

8. The cartridge dispenser of claim 5, further comprising:
a resilient tube carried within said dispenser head, said resilient tube providing a flow path generally between said cartridge and said outlet port, wherein when the first inch valve is in the first position, the resilient tube is open to allow flow of the flowable material through the resilient tube and past the first pinch valve, and wherein when the first pinch valve is in the second position, the resilient tube is pinched off to prevent flow of the flowable material to the outlet port.

9. The cartridge dispenser of claim 8, wherein when the first pinch valve and the second pinch valve are in their respective first positions, the resilient tube is open to allow flow of the flowable material through the resilient tube to the outlet port, and wherein when at least one of the first or second pinch valves is in its second position, the resilient tube is pinched off to prevent flow of the flowable material to the outlet port.

10. The cartridge dispenser of claim 9, wherein said first pinch valve is located along said resilient tube at a position closer to said cartridge than said second pinch valve, said controller configured to operate said first and second pinch valves in succession such that at the end of a dispensing cycle, said first and second pinch valves are each placed in their second positions thereby stopping the flow of the flowable material to the outlet port, and then said second pinch valve is moved to its first position to thereby suck back flowable material from the outlet port.

11. A cartridge dispenser, comprising:
an actuator;
a cartridge carrier configured to house a removable cartridge having a pre-proportioned amount of flowable material therein;
a dispenser head mounted to said cartridge carrier, said dispenser head having:
an outlet port,
a resilient tube carried within said dispenser head, said resilient tube providing a flow path generally between said removable cartridge and said outlet port,
a first pinch valve configured to move between a first position and a second position, wherein, in the first position of the first pinch valve, the resilient tube is fully open to allow flow of the flowable material through the resilient tube and past the first pinch valve, and in the second position of the first pinch valve, the resilient tube is pinched off to prevent flow of the flowable material to the outlet port, and
a second pinch valve configured to move between a first position and a second position, wherein, in the first position of the second pinch valve, the resilient tube is fully open to allow flow of the flowable material through the resilient tube and past the second pinch valve, and in the second position of the second pinch valve, the resilient tube is pinched off to prevent flow of the flowable material to the outlet port,
wherein the dispenser head has a first configuration and a second configuration, wherein, in the first configuration, the first pinch valve and the second pinch valve are in their respective first positions, and in the second configuration, at least one of the first pinch valve and the second pinch valve are in their respective second positions; and
a cartridge piston responsive to said actuator and configured to protrude into the removable cartridge to apply pressure to the flowable material and force an amount of flowable material from said removable cartridge through said outlet port of said dispenser head.

12. The cartridge dispenser of claim 11, wherein said dispenser head further comprises a multi-piece assembly allowing said resilient tube to be removed from said dispenser head and cleaned and/or replaced for maintenance.

13. The cartridge dispenser of claim 11, wherein the resilient tube is open to allow flow of the flowable material through the resilient tube to the outlet port when the first and second pinch valves are in their respective first positions, and the resilient tube is pinched off to prevent flow of the flowable material to the outlet port when at least one of the first or second pinch valves is in its second position.

14. The cartridge dispenser of claim 13, wherein said first pinch valve is located along said resilient tube at a position closer to said cartridge than said second pinch valve, and further comprising a controller, said controller configured to operate said first and second pinch valves in succession such that at the end of a dispensing cycle, said first and second pinch valves are each placed in their second positions thereby stopping the flow of the flowable material to the outlet port, and then said second pinch valve is moved to its first position to thereby suck back flowable material from the outlet port.

15. A method of operating a cartridge dispenser including cartridge having a pre-proportioned amount of flowable material therein, a dispenser head mounted to the cartridge and having an outlet port, a cartridge piston configured to protrude into the cartridge, and a first pinch valve, a second pinch valve and a resilient tube carried within the dispenser head, the resilient tube providing a flow path generally between the cartridge and the outlet port, and the method comprising:

placing the first pinch valve in a first position to form a flow path within the resilient tube past the first pinch valve;

placing the second pinch valve in a first position to form the flow path within the resilient tube past the second pinch valve;

moving the cartridge piston into the cartridge to apply pressure to the flowable material and thereby move the flowable material through the cartridge and through the resilient tube past the first pinch valve and the second pinch valve; and moving the first pinch valve or the second pinch valve to a second position to pinch off the resilient tube and stop the flow of flowable material past the first pinch valve or the second pinch valve to the outlet port.

16. The method of claim 15, wherein the first pinch valve is located along the resilient tube at a position closer to the cartridge than the second pinch valve, and the method further comprises:

operating the first and second pinch valves in succession at the end of a dispensing cycle, such that the first and second pinch valves are each placed in their second positions to stop the flow of the flowable material to the outlet port, and then the second pinch valve is moved to its first position to thereby suck back flowable material from the outlet port.

\* \* \* \* \*